United States Patent Office 3,459,621
Patented Aug. 5, 1969

3,459,621
INSTALLATION FOR MANUFACTURING
REINFORCED PLASTIC PIPES
Alexandr Yakovlevich Kamenyarzh and Vladimir Lvovich
Ryvkin, Odessa, U.S.S.R., assignors to Zavod Stroitelno-
Otdelochnykh Mashin, U.S.S.R.
Filed Aug. 26, 1965, Ser. No. 482,818
Int. Cl. B65h 81/06; B32b 31/30; B29d 23/05
U.S. Cl. 156—393                              3 Claims

ABSTRACT OF THE DISCLOSURE

Apparatus for manufacturing reinforced plastic pipe wherein a hose of interwoven longitudinal and lateral reinforcing yarn is continuously formed and fed to a die concurrently with a molding compound. The hose is formed by winding the lateral yarn around a core in a plane perpendicular to the longitudinal yarn while the supply spools of the latter are alternately shifted from one side to the other of said plane.

---

The present invention relates to apparatus for manufacturing reinforced plastic pipes and in particular, to apparatus which ultilizes devices for continuous delivery of molding compound and devices for lateral and longitudinal laying of reinforcement yarn supplied from spools.

A disadvantage of the known apparatus for manufacturing reinforced plastic pipes is that the lateral yarns are laid on the longitudinal ones without interweaving, in which case, as the practice has shown, the lateral and longitudinal yarns do not form a sufficiently strong reinforcing hose.

An object of the present invention is to eliminate said disadvantage.

It is a particular object of the invention to provide an installation for manufacturing reinforced plastic pipes, which make it possible to obtain an interwoven reinforced hose and to locate it within the body of a plastic pipe.

In the accomplishment of the above and other objects of the invention, the device for lateral and longitudinal laying of yarn supplied from spools is provided with a means for alternate shifting of the laterally-laid yarn from one side to the other, starting from the plane of rotation of the laterally-laid yarn and back, while laying the lateral turns and progressing the longitudinal yarn to insure the interweaving of said longitudinal and lateral yarn of the reinforcement which is continuously delivered into pipe extrusion die of the device for continuous supply of molding compound.

It is feasible to provide the means for alternate shifting of longitudinal yarn with holders serving to receive the spools of longitudinally-laid yarn so that the spools have the possibility of traveling together with the yarn from one side to the other, starting from the plane of rotation of the laterally laid yarn, and back.

Means for alternate shifting of longitudinal yarn along with the spools comprises a split ring whose cross section smoothly increases from one to the other end of the gap, and holders of spools for longitudinally laid yarn, said holders being positioned at both sides of the ring, the shifting of the spools from one side to the other from the plane of rotation of lateral yarn and back going on through the gap of the ring.

The device of the invention enables obtaining much stronger plastic pipes.

The invention will become more apparent from the following detailed description of an embodiment thereof with reference to the accompanying drawing, wherein.

Figure 4:
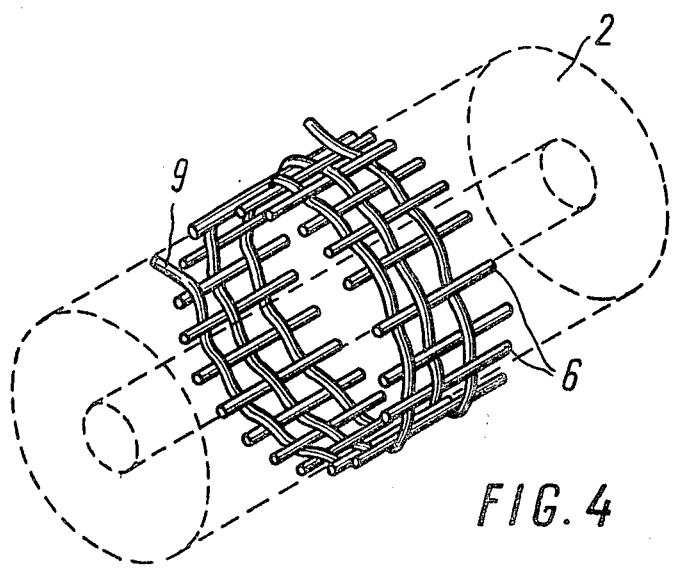
Figure 5:
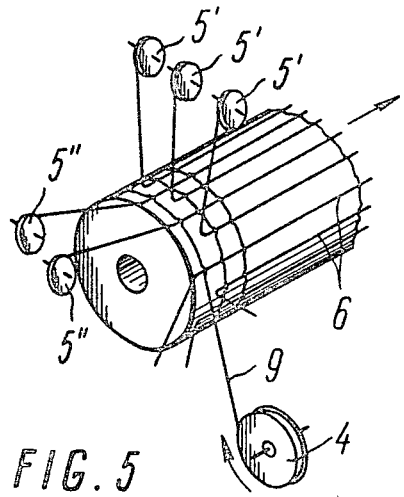
Figure 6:
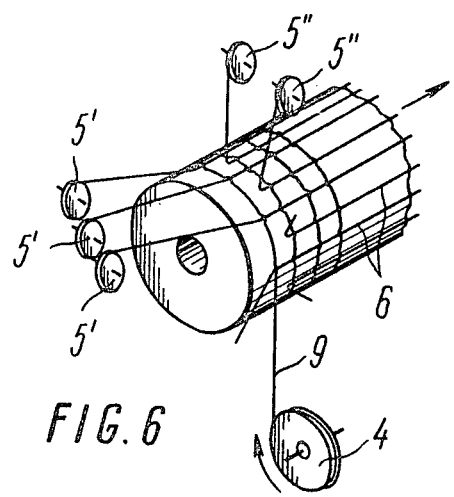
Figure 7:
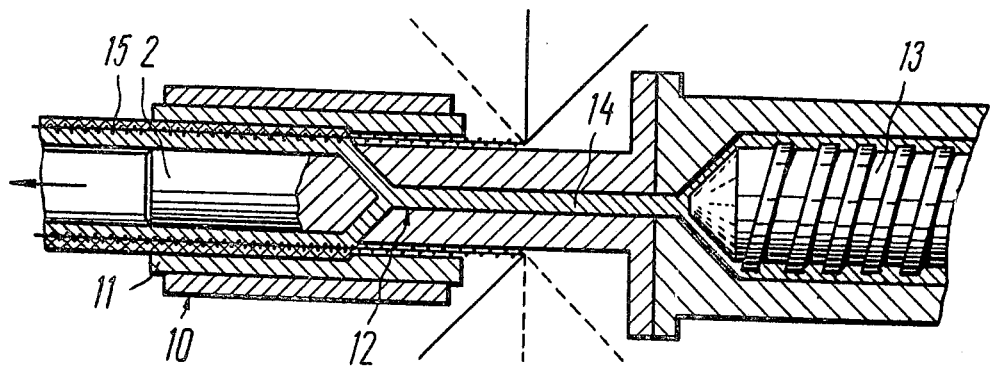
Figure 8:
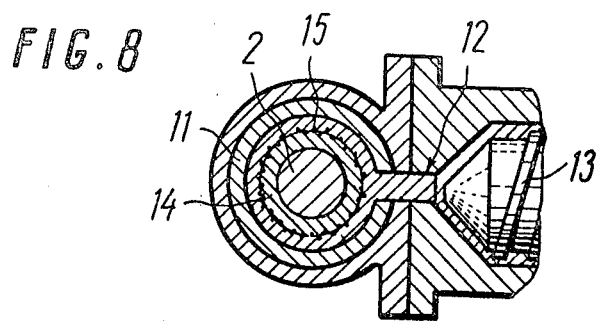

FIG. 4 diagrammatically shows in solid lines a manufactured reinforced hose;

FIGS. 5 and 6 are diagrammatic illustrations showing weaving of the reinforcing hose in first and second respective positions of the spools for longitudinal laying of yarn; and FIGS. 7 and 8 are schematic diagrams showing, in section, the delivery cycle of molding compound.

Figure 1:
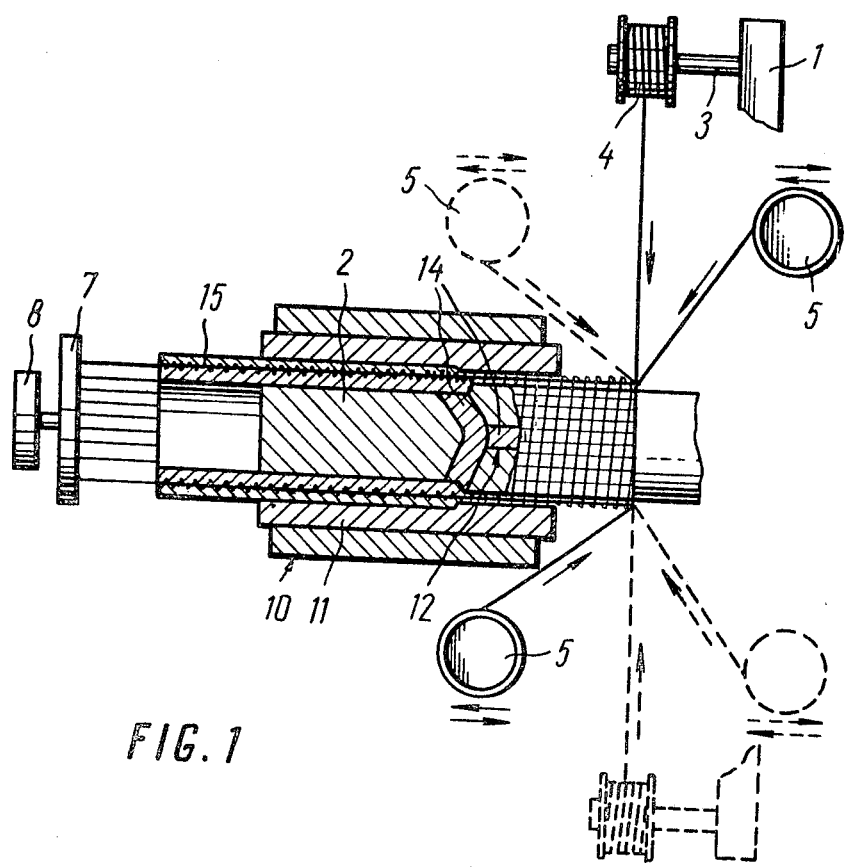
FIG. 1 is a diagrammatic illustration partly in section of apparatus for manufacturing reinforced plastic pipe with a device for lateral and longitudinal laying of yarn on the core (the device for continuous delivery of molding compound not being shown in the drawing)

Spool holder 1 rotates around the axis of core 2 (FIG. 1). Secured in spool holder 1 is a spool, i.e. coil 4 rotating on axle 3 and serving for lateral laying of yarn.

Coils 5 serving to longitudinally lay the yarn are spaced at both sides of the yarn, which slips off coil 4 for lateral laying, and are able to reciprocate along the axis of core 2 within the operating zone of hose weaving.

Warp 6 of the reinforcing hose (FIGS. 4, 5 and 6) is formed by yarn from coils 5, the number of which corresponds to the number of yarns of warp 6. When starting the manufacture of the reinforced hose, the yarns of warp 6 are secured in clamp 7 of pulling device 8.

Weft 9 of the reinforcing hose (FIGS. 4, 5 and 6) is formed by the yarn supplied from coil 4 for lateral laying. When spool 1 is rotating, the yarn from coil 4 is wound on warp 6.

The interweaving of yarn of warp 6 and weft 9 is effected in the following manner.

Coils 5 serving for longitudinal laying of yarn are positioned at both sides of a yarn which leaves coil 4 for lateral laying in stepped order: the 1st, 3rd, 5th, etc.—to the left (FIG. 1), 2nd, 4th, 6th, etc. to the right, that is, in one pitch of warp 6.

The position of coils may be of some other type: two coils to the right, two coils to the left, etc.

Due to such arrangement of coils 5, half of the yarns of warp 6, when winding up weft 9, is found to be pressed by a yarn turn of weft 9, during one revolution of spool holder 1 (for coils 5 in the right-hand position), and the second half of warp 6 remains free (for coils 5 in the left-hand position, as shown in FIG. 1).

At the beginning of the next revolution coils 5 are mutually displaceable along the axis of core 2: the left-side coils to the right, the right-side coils to the left.

As shown in FIG. 5, coils 5' are spaced to the right of warp 6, while coils 5" are shaped to the left. The yarn turn of weft 9 is laid over the yarn unwound from coils 5" and presses the yarn against the core 2. As soon as spool holder 1 makes one complete revolution around the axis of core 2, coils 5' and 5" change places. In this case, the turn of weft 9 overlaps yarn 5' of warp 6, while yarn 5" remains free (FIG. 6).

Under the action of pulling device 8, the woven portion of the hose (FIG. 4) is delivered to pipe extrusion die 10, while the interweaving of yarn of weft 9 and warp 6 still continues on the operating portion of core 2.

Similarly, the interweaving may be performed due to reciprocating motion of the longitudinal yarn proper along the core axis without travel of coils under the action of any of the known means, e.g., of heads.

The woven hose is delivered to die 10 formed by bushing 11 and the tip of core 2. The hollow of die 10, whereinside the woven hose is progressing, is supplied with a molding compound, e.g., thermoplastic, through inlet channels 12 of core 2.

The device serving to continuously deliver the molding compound is made as a screw press 13 (FIG. 7).

The hollow of die 10 is so filled with molding compound that the reinforcing hose is found to be symmetrically positioned relative to the axis of bushing 11 within the layer of molding material. The delivery of molding compound can also be effected externally of the reinforcing hose, as shown in FIG. 8.

In FIGS. 1, 7 and 8 the molding compound is designated as 14, while the reinforcing hose is designated as 15.

Figure 2:
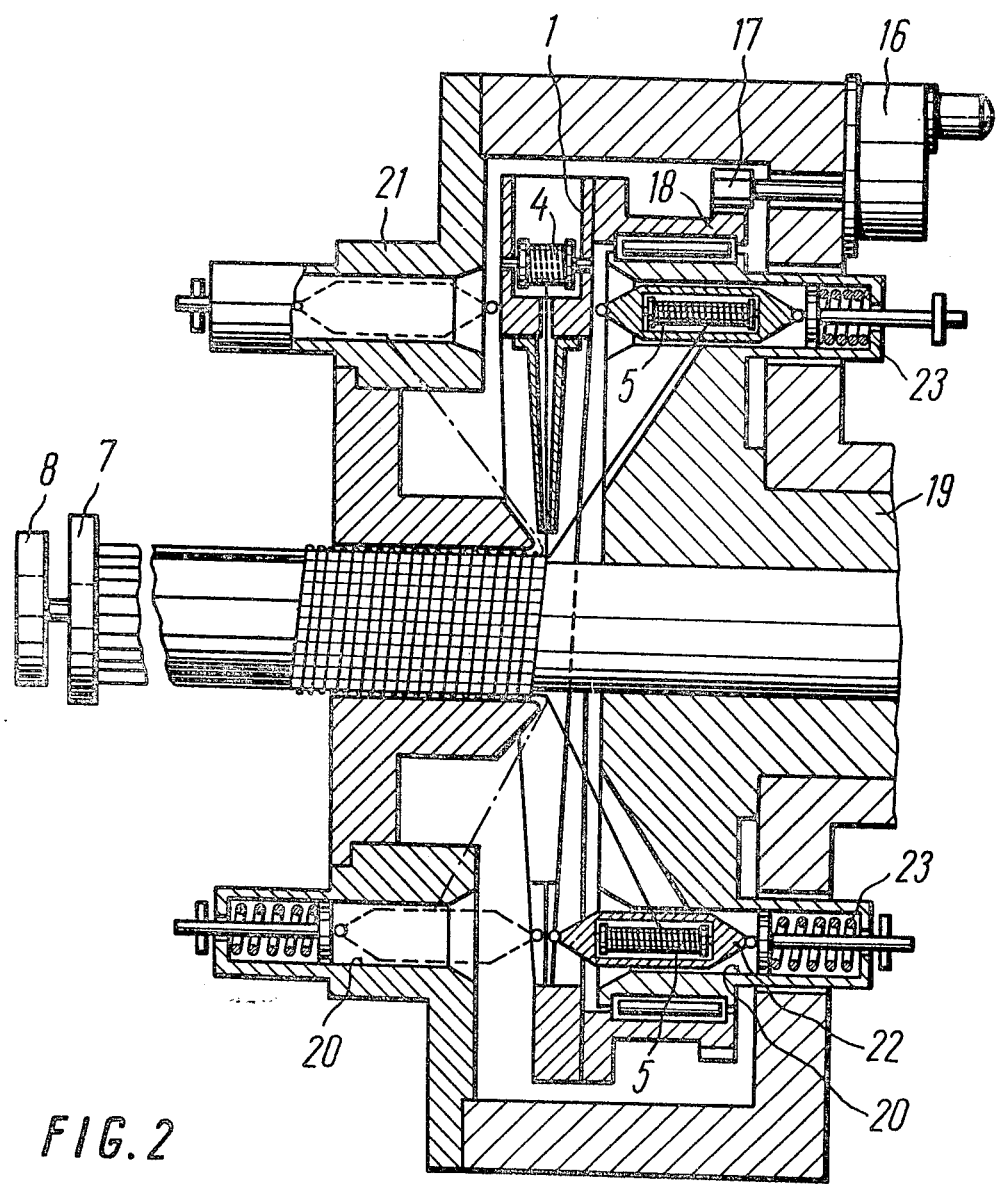
FIG. 2 shows a part of the apparatus shown in cross-section with the device for lateral and longitudinal laying of yarn, said device being provided with means for alternate shifting of longitudinally laid yarn.

The manufacture of reinforced plastic pipes can be performed by an apparatus, the design of which is shown in FIG. 2, said apparatus operating according to the elementary diagrammatic showing in FIG. 1.

Spool holder 1 is imparted a rotary motion from drive 16 through gears 17 and 18, the latter gear rotating around member 19. Mounted and rotating within spool holder 1 is coil 4 with the laterally laid yarn.

Set in holders 20, formed as sockets in members 19 and 21, are spools 22 with coils 5 of the longitudinally laid yarn.

As mentioned above, the longitudinal yarns are set, before starting the operation, into clamp 7 of pulling device 8. The lateral yarn is also secured on the pulling device or on the longitudinal yarn.

Spools 22 are positioned in alternating order at both sides of lateral yarn unwound from coil 4 i.e. in successive alternation or in groups, within the sockets (holders) 20 of members 19 and 21.

Sockets 20 also accommodate springs 23 which press spools 22 against the side surfaces of spool holder 1 made as a split ring (FIGS. 2 and 3) of variable cross-section smoothly increasing from one to the other end of the gap. The split ring with holders 20 (sockets in members 19 and 21) positioned at both sides thereof to receive spools 22 with coils 5 of longitudinally laid yarn form a means for the alternate shifting of the longitudinally laid yarn. As spool holder 1 rotates, spools 22 with coils 5, when opposite the gap, jump under the action of springs to the opposite side of the ring into respective socket 20, that is spools 22 jump from sockets 20 of member 19 into sockets 20 of member 21 and vice versa.

Thus, spools 22 with coils 5 for the longitudinal laying of the yarn change their position relative to the laterally laid yarn.

Spool holder 1, while rotating, presses by its side skew surfaces the spools 22, thereby compressing spring 23 in sockets 20, thus facilitating the changeover of spools 22 at the instant when the gap of spool holder 1 is in registry with said spools.

Figure 3:
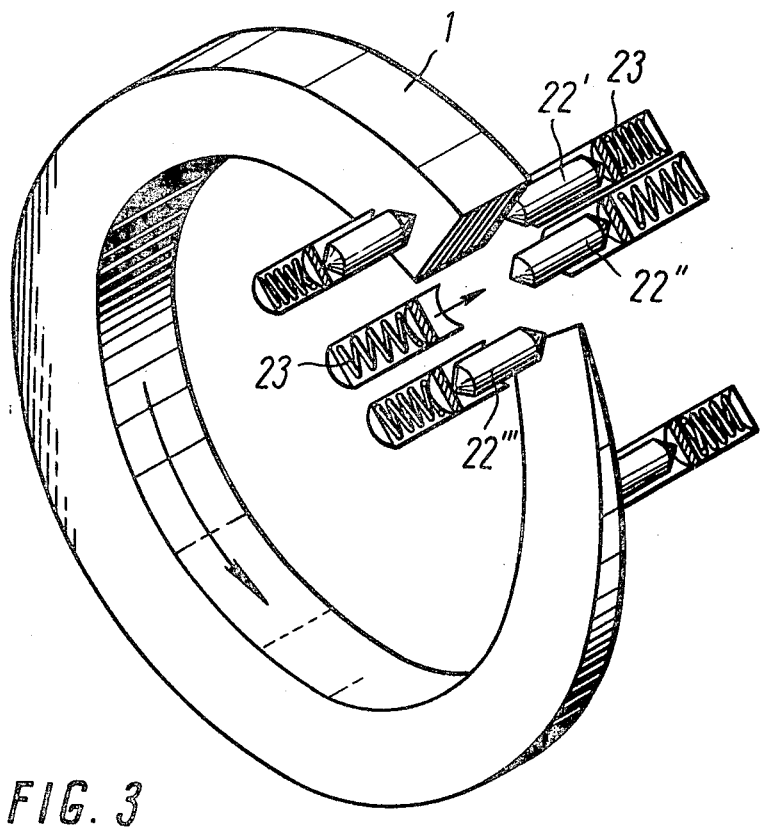
FIG. 3 is a perspective view partly broken away of a device for alternate shifting of the longitudinally laid yarn, shown along with the spools.

The changeover of spools will be apparent from FIG. 3. Therein, the position of spool 22' before changeover from right to left is shown in the drawing with spring 23 being compressed and the gap of spool holder 1 approaching spool 22'. As soon as the gap of spool holders is in registry with spool 22'', spring 23 propels spool 22'' to the position 22''' on the opposite side of spool holder 1.

After changeover of spool 22'' from right to left, spring 23 starts to compress for a subsequent changeover of spool 22''' through a complete revolution of spool holder 1 to the opposite side.

If spools 22 are positioned at both sides of spool holder 1 in groups, then the interweaving of lateral yarn will take place not with each longitudinal yarn, but with the groups of yarns. This version is not shown in the drawings.

What is claimed is:

1. Apparatus for manufacturing reinforced plastic pipe, said apparatus comprising a die, means for continuous delivery of molding compound through said die, rotatable means for winding lateral reinforcement yarn in a plane, supply means for longitudinal reinforcement yarn which is to be interwoven with the lateral reinforcement yarn, means for alternately shifting said supply means from one side to the other of said plane of rotation of the rotatable means, and means for longitudinally advancing the longitudinal reinforcement yarn towards said die as said supply means is being alternately shifted to cause the longitudinal and lateral yarns to be interwoven and fed to said die for incorporation into the molding material delivered thereto.

2. Apparatus for manufacturing reinforced plastic pipe comprising means for continuous delivery of molding compound through a die; a device for the lateral and longitudinal laying of reinforcement yarn supplied from spools, said device being operative in rotation to wind the lateral yarn in a plane, spool holders serving to receive said spools of the longitudinally laid yarn, means mounted on said device for acting on said spool holders for the spools carrying the longitudinal yarn to alternately shift the same and the longitudinally laid yarn, such that said spools travel together with their yarn, in alternation, from one side to the other of the plane of rotation of the laterally laid yarn while the lateral yarn is being wound and while moving the longitudinal yarn to provide for interweaving of the longitudinal and lateral yarn of the reinforcement, and means for continuously advancing the thus woven reinforcement yarn into said die.

3. Apparatus as claimed in claim 2 wherein said means for shifting the spool holders for the spools carrying the longitudinal yarn comprises a split ring having a gap and a cross-section smoothly increasing from one to the other end of the gap, said ring being mounted within said device for the lateral and longitudinal laying of the yarn, said spool holders for the spools carrying the longitudinal yarn being positioned at both sides of said ring and being urged against said ring to travel together with the yarn through the gap of said ring in alternation from one side to the other when said gap is in registry with the holders.

References Cited

UNITED STATES PATENTS 3,020,935   2/1962   Balis _____ 138—125 XR
3,066,720   12/1962  Fontaine _____ 156—393

ROBERT F. BURNETT, Primary Examiner

R. H. CRISS, Assistant Examiner

U.S. Cl. X.R.

18—13; 138—125; 139—13; 156—500